United States Patent
Guisasola et al.

(10) Patent No.: US 12,460,589 B2
(45) Date of Patent: Nov. 4, 2025

(54) METHOD FOR CONTROLLING OPERATION OF AN INTERNAL COMBUSTION ENGINE WHICH RUNS ON A FUEL MIXTURE OF HYDROGEN AND NATURAL GAS

(71) Applicant: Caterpillar Energy Solutions GmbH, Mannheim (DE)

(72) Inventors: Inigo Guisasola, Landau (DE); Olaf Berger, Dudenhofen (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 7 days.

(21) Appl. No.: 18/370,019

(22) Filed: Sep. 19, 2023

(65) Prior Publication Data
US 2024/0102425 A1     Mar. 28, 2024

(30) Foreign Application Priority Data
Sep. 27, 2022 (GB) ..................... 2214048

(51) Int. Cl.
*F02D 19/02* (2006.01)
*F02D 41/00* (2006.01)

(52) U.S. Cl.
CPC ......... *F02D 19/023* (2013.01); *F02D 19/026* (2013.01); *F02D 41/0027* (2013.01)

(58) Field of Classification Search
CPC ..... F02D 19/023; F02D 19/0644; F02D 19/08
See application file for complete search history.

(56) References Cited

U.S. PATENT DOCUMENTS

| | | | |
|---|---|---|---|
| 4,884,533 A | 12/1989 | Risitano et al. | |
| 5,201,840 A * | 4/1993 | Sausner | F02D 35/025 123/41.15 |
| 5,642,717 A * | 7/1997 | Gilman | F02B 77/089 374/185 |
| 7,637,251 B2 | 12/2009 | Kuo et al. | |
| 10,006,401 B2 | 6/2018 | Lawler et al. | |
| 2003/0041836 A1 | 3/2003 | Roberts | |
| 2005/0188683 A1* | 9/2005 | Miyoshi | F02D 19/081 60/285 |
| 2009/0222194 A1* | 9/2009 | Bowman | F02D 41/3094 123/90.15 |

(Continued)

FOREIGN PATENT DOCUMENTS

| | | |
|---|---|---|
| EP | 3385523 A1 | 10/2018 |
| GB | 2550169 A | 11/2017 |
| KR | 101241194 B1 | 3/2013 |

OTHER PUBLICATIONS

Extended European Search Report for EP Patent Appln. No.23195997.4, mailed Mar. 4, 2024 (8 pgs).

(Continued)

*Primary Examiner* — Long T Tran

(57) ABSTRACT

The present invention pertains to a method for controlling operation of an internal combustion engine configured to run on a fuel mixture of hydrogen and natural gas. The method comprises a step of obtaining temperature values measured by at least one temperature sensor provided in a cylinder head of the engine; and a step of controlling operation of the engine in dependence on the temperature values.

15 Claims, 2 Drawing Sheets

(56) References Cited

U.S. PATENT DOCUMENTS

| | | | |
|---|---|---|---|
| 2011/0088657 A1* | 4/2011 | Tanno | F02D 19/061 |
| | | | 123/305 |
| 2011/0209691 A1* | 9/2011 | Kuroki | F02D 21/04 |
| | | | 123/568.21 |
| 2012/0160221 A1* | 6/2012 | Munshi | F02M 21/0206 |
| | | | 123/575 |
| 2012/0260886 A1* | 10/2012 | Mulye | F02D 41/1446 |
| | | | 123/25 C |
| 2014/0305393 A1 | 10/2014 | Farooqui et al. | |
| 2016/0040592 A1* | 2/2016 | Zajac | F02D 19/022 |
| | | | 123/527 |
| 2016/0169142 A1 | 6/2016 | Klingbeil et al. | |
| 2017/0016872 A1* | 1/2017 | Nakasaka | G01M 15/08 |
| 2018/0080400 A1 | 3/2018 | Imaoka et al. | |
| 2018/0313280 A1* | 11/2018 | Kim | F02D 35/026 |
| 2018/0320602 A1* | 11/2018 | Okabayashi | F02D 41/0025 |
| 2018/0320616 A1* | 11/2018 | Hoshi | F02D 45/00 |
| 2018/0363575 A1 | 12/2018 | Koponen | |
| 2019/0301382 A1* | 10/2019 | Asai | F02B 75/18 |
| 2020/0318570 A1* | 10/2020 | Hampson | F02D 35/028 |
| 2022/0120228 A1 | 4/2022 | Baaqel et al. | |

OTHER PUBLICATIONS

Great Britain Search Report related to Application No. 2214048.7; reported on Mar. 8, 2023.

\* cited by examiner

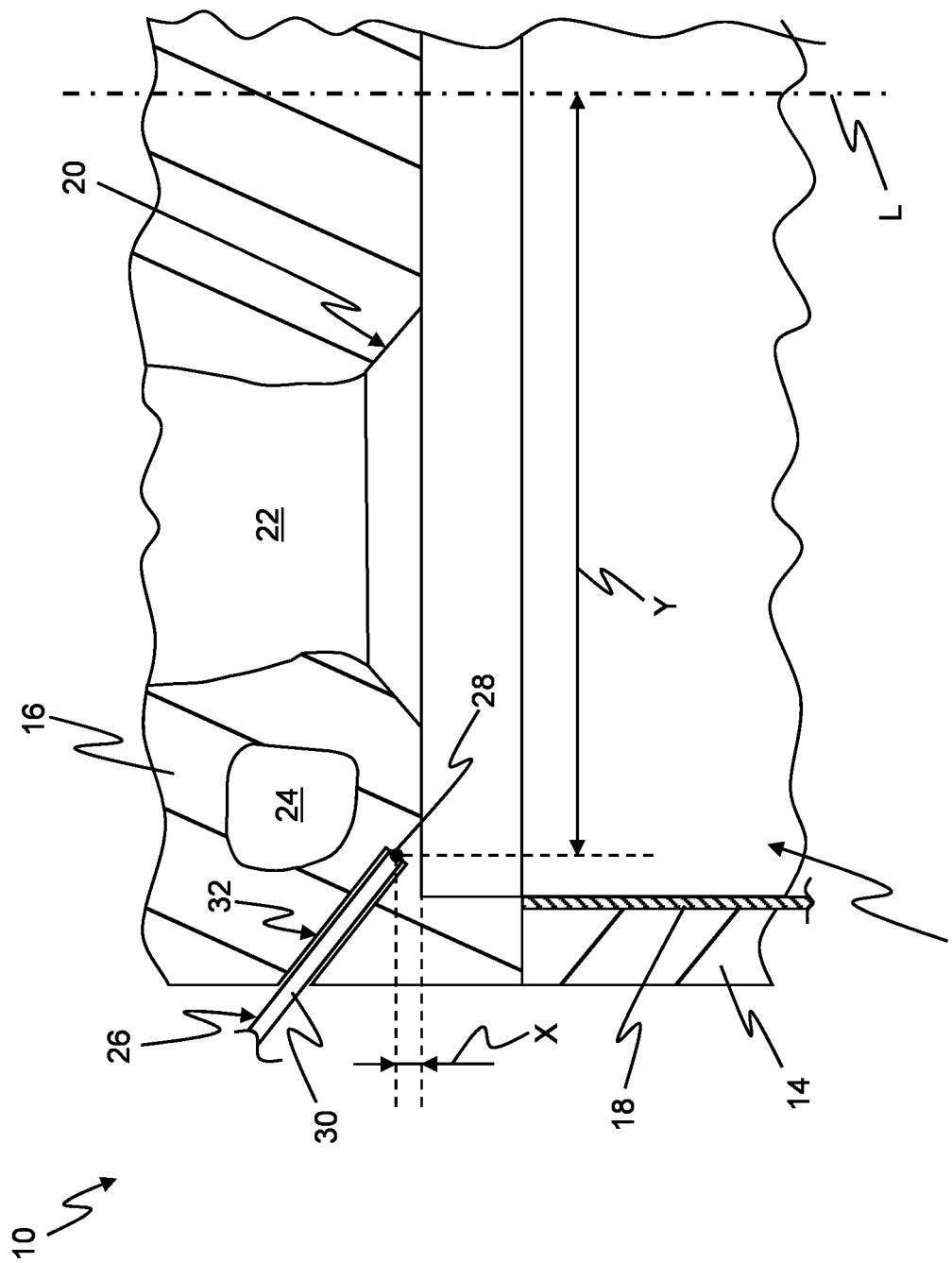

METHOD FOR CONTROLLING OPERATION OF AN INTERNAL COMBUSTION ENGINE WHICH RUNS ON A FUEL MIXTURE OF HYDROGEN AND NATURAL GAS

CROSS-REFERENCE TO RELATED APPLICATION

This application claims priority under 35 USC 6119 and the Paris Convention to Great Britain Patent Application No. 2214048.7 filed on Sep. 27, 2022.

TECHNICAL FIELD

The present invention pertains to a method for controlling operation of an internal combustion engine which is configured to run on a fuel mixture of hydrogen and natural gas. Further, the present invention pertains to an internal combustion engine applying such a method.

TECHNOLOGICAL BACKGROUND

For environmental reasons, in particular for reducing polluting emissions, the use of hydrogen as an additive to hydrocarbon fuels continuous to grow in importance, in particular in the field of gas engines. Accordingly, the use of gas engines is known which run on a fuel mixture comprising natural gas enriched with hydrogen. However, in such gas engine applications, the supply of hydrogen may unreliably or unintendedly vary during operation of the engine.

SUMMARY OF THE INVENTION

Accordingly, it is an objective to provide an improved method for controlling operation of an internal combustion engine which runs on a hydrogen-natural gas fuel mixture of a varying ratio, in particular of an unintendedly varying ratio. It is a further objective to provide an internal combustion engine in which such a method is applied.

These objectives are solved by the subject matter of the independent claims. Preferred embodiments are set forth in the present specification, the Figures as well as the dependent claims.

Accordingly, a method is provided for controlling operation of an internal combustion engine which is configured to run on a fuel mixture of hydrogen and natural gas. The method comprises a step of obtaining temperature values measured by at least one temperature sensor provided in a cylinder head of the engine; and a step of controlling operation of the engine in dependence on the obtained temperature values.

Furthermore, an internal combustion engine is provided which is equipped with a control unit. The control unit may be used to perform the method as described above. Accordingly, technical features which are described in connection with the method hereinafter may also relate and be applied to the proposed internal combustion engine, and vice versa.

The proposed internal combustion engine is configured to run on a fuel mixture of a natural gas and hydrogen and comprises at least one temperature sensor provided in a cylinder head of the engine and a control unit configured for obtaining temperature values measured by the temperature sensor and for controlling operation of the engine in dependence on the obtained temperature values.

BRIEF DESCRIPTION OF THE DRAWINGS

The present disclosure will be more readily appreciated by reference to the following detailed description when being considered in connection with the accompanying drawings in which:

FIG. 2 schematically shows a longitudinal section of the internal combustion engine.

DETAILED DESCRIPTION OF PREFERRED EMBODIMENTS

Figure 1:
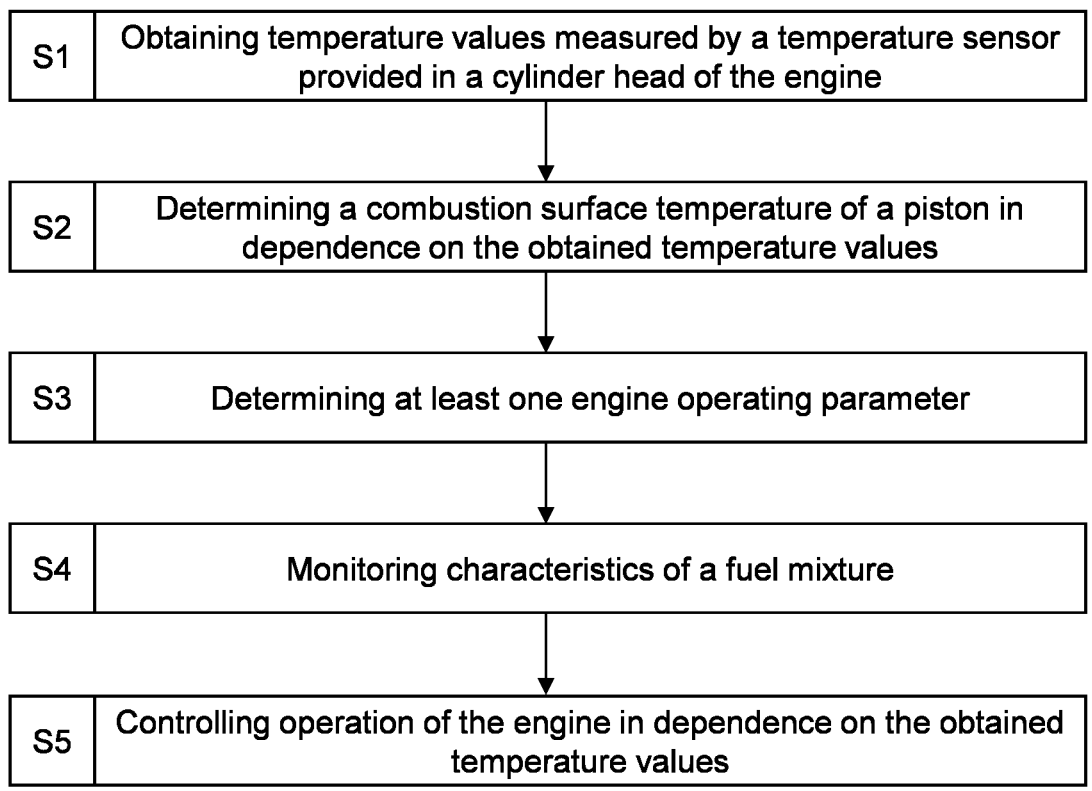
FIG. 1 shows a flow diagram illustrating an embodiment of a method for controlling operation of an internal combustion engine.

In the following, the invention will be explained in more detail with reference to the accompanying Figures.

FIG. 1 shows a flow diagram illustrating a method for controlling operation of an internal combustion engine 10, a longitudinal section of which is schematically depicted in FIG. 2. The internal combustion engine 10, which is referred to as "the engine" hereinafter, is provided in the form of a gas engine configured to run on a hydrogen-natural gas fuel mixture. As such, the engine 10 is configured to run on natural gas enriched with hydrogen, wherein a hydrogen concentration of the fuel mixture may vary during operation. For example, the hydrogen concentration in the fuel mixture may be in the range of 0% to 30%, in particular in the range of 0% to 20% (% by volume). In other words, the engine 10 is intended and configured to run on a fuel mixture of a varying ratio of hydrogen and natural gas.

The method is not limited to internal combustion engines of a specific application and may be applied among different technical fields, such as gas engines used in power plants or vehicles as a main or auxiliary engine or the like.

The engine 10 comprises a plurality of cylinders 12, e.g., four, eight, twelve or eighteen cylinders, which may be arranged according to different cylinder layouts, such as according to an in-line configuration or a V-configuration. The cylinders 12 are provided in an engine block 14 and are delimited from above by at least one cylinder head 16 as depicted in FIG. 2. In general, the cylinder head 16 refers to a component of the engine 10 which is mounted to the engine block 14 and which partly delimits one or more combustion chambers of the engine 10. Accordingly, the cylinder head 16 may be associated to one or more cylinders 12 of the engine 10. As such, the engine 10, depending on its configuration, may comprise a single cylinder head or more than one cylinder head. For example, in a configuration of the engine in which cylinders are arranged in a plurality of banks or rows, e.g. as employed in a V-configuration, separate cylinder heads may be provided per bank or row.

A side wall of the cylinder 12 is formed by a cylinder liner 18 which is press-fitted into a correspondingly designed cylindrical recess of the engine block 14. Each cylinder 12 accommodates one piston (not shown) which, together with an inner surface of the cylinder 12, delimits an associated combustion chamber within the cylinder 12. As such, the combustion chamber extends from a head portion of the piston, i.e. an end face thereof, to the cylinder head 16, which sits on top of the engine block 14.

The pistons are configured for reciprocating and axial movement within their associated cylinder 12 along a longitudinal axis L of the cylinder 12. In the context of the present disclosure, the 'longitudinal axis L' refers to an axis which coincides with a middle axis of the cylinder 12, the piston and the cylinder liner 18. As such, the longitudinal axis L coincides with a symmetry axis of a circumferential inner surface of the cylinder's side wall and with a symmetry axis of a circumferential outer surface of the piston.

The engine 10 further comprises a control mechanism which controls actuation of an intake system for selectively supplying a fuel-air mixture into the combustion chamber, actuation of an ignition system (not shown) for selectively igniting the fuel-air mixture received in the combustion chamber, and actuation of an expelling system (not shown) for selectively expelling combustion gases from the combustion chamber. By such a configuration, i.e. upon selectively supplying and igniting the fuel-air mixture in the combustion chamber, high-temperature and high-pressure gases are produced in the combustion chamber which apply forces to and thus axially move the piston along the longitudinal axis L, thereby rotating a crankshaft of the engine. In this way, chemical energy is transformed into mechanical energy.

For supplying the fuel-air mixture into the combustion chambers and for expelling combustion gases therefrom after combustion took place, the cylinder head 16 accommodates a plurality of valves (not shown) which are configured to control timing and quantity of medium exchange within associated combustion chambers of the engine 10. For doing so, the engine 10 comprises a valve actuating mechanism, typically including a camshaft which may at least partly be accommodated in the cylinder head 16.

The valves accommodated in the cylinder head 16 may be provided in the form of poppet valves and may include inlet valves and exhaust valves. Each cylinder of the engine may be associated to one or more inlet valves and one or more exhaust valves. Accordingly, the cylinder head 16 may be configured to receive one or more inlet valves and one or more exhaust valves per cylinder 10 of the engine 10. For receiving the valves, the cylinder head 16 is provided with a plurality of valve seats 20, each of which is intended and configured for accommodating and supporting one associated valve. By this configuration, the valves are configured to selectively open or close an associated intake port 22 or exhaust port used for medium exchange.

The intake port 22 forms a part of the intake system for selectively supplying the fuel-air mixture into the combustion chamber. In the shown configuration, the fuel-air mixture is generated upon mixing intake air and the fuel mixture comprising natural gas and hydrogen before being introduced into the combustion chamber. Alternatively, the engine may be provided such that intake air and the fuel mixture are separately introduced into the combustion chamber by separate intake ports. In this way, the fuel-air mixture may be generated upon separately supplying the intake air and the fuel mixture into the combustion chamber.

As shown in FIG. 2, the cylinder head 16 is further provided with at least one cooling channel 24 through which a cooling medium, in particular water, is selectively flown through to dissipate heat from the cylinder 12 during operation of the engine 10. The engine 10 further comprises a cooling management system which is configured to selectively adjust and control the supply of cooling medium to the at least one cooling channel 24. For example, the cooling management system may be configured to selectively adjust a temperature of the cooling medium before being introduced into the cylinder head 16 and/or to adjust a flow rate of the cooling medium being directed through the at least one cooling channel 24.

As set forth above, the engine 10 comprises the control mechanism which controls combustion processes in the engine 10. The control mechanism comprises an engine control unit (not shown), also referred to as "control unit" in herein. The control unit may be an electronic control unit which controls a series of actuators of the control mechanism to set a desired operating condition of the engine 10. For doing so, the control unit reads out input data from a plurality of sensors being indicative of actual engine operating parameters and interprets these input data, e.g. by using multidimensional performance maps, to adjust and set the engine actuators. The control unit may also be configured to control the composition and supply of fuel to the engine and thus may also be referred to as an "electronic engine management system".

The basic structure and mode of operation of the engine 10 and its components are well known to a person skilled in the art and are thus not further specified. Rather, the method for controlling operation of the engine 10 and characteristics of the engine 10 which are interlinked with the present invention are addressed in the following. It is apparent to the skilled person that the engine 10, in addition to the above described components, may include further components not addressed herein.

A set forth above, FIG. 1 depicts a flow diagram of the method for controlling operation of the engine 10. In the shown embodiment, the method is performed by the above described control unit of the engine 10, but is not limited to this implementation. Rather, the method may also be performed by any type of device or any type of component capable of interpreting and/or executing information and/or instructions to control operation of the engine 10, in particular to control combustion processes therein.

In a first step S1 of the method, the control unit obtains data, in particular temperature values, measured by a temperature sensor 26 which is provided in the cylinder head 16 of the engine 10 and which is associated to one cylinder 12. In the context of the present disclosure, "temperature values" refer to any data being indicative of a temperature or change of temperature prevailing at a measuring point 28 of the temperature sensor 26.

In the following, for reasons of reduced complexity, the method is described with reference to one cylinder 12 only. However, the skilled person understands that method steps related to this single cylinder 12 may apply and be performed for the other cylinders of the engine 10 accordingly. That is, the control unit may be configured to obtain temperature values measured by further temperature sensors which are associated to other cylinder. These further temperatures sensors may be provided and arranged relative to their associated cylinder likewise to the temperatures sensor 26.

In the context of the present disclosure it has been found that, by using a temperature sensor 26 located within the cylinder head 16, the thus measured temperature values can be used to evaluate and quantify combustion processes within the combustion chamber. Specifically, it has been found that the thus measured values can be used to evaluate and quantify a combustion surface temperature of the piston, i.e. a temperature prevailing at a surface of the piston, i.e. at the end face of the piston delimiting the combustion chamber. In other words, the proposed method enables to indirectly measure the temperature within the combustion chamber, based on which an improved control of the engine may be allowed, as described below in connection with method step S5.

Accordingly, the temperature sensor 26 is provided such that the temperature values measured by the temperature sensor 26 are indicative of the combustion surface temperature of the piston. More specifically, the temperature sensor 26 is provided in the cylinder head 16 such that the temperature values measured by the temperature sensor 26 correlate to the combustion surface temperature of the piston. For achieving such a correlation, the temperature sensor 26 is located at a predefined position within the cylinder head 16.

Specifically, the temperature sensor 26 is positioned within the cylinder head 16 such that, during operation of the engine 10, thermal conditions or heat conduction properties, in particular thermal convection properties and/or cooling properties and/or a heat flow, at the measuring point 28 correspond to or substantially correspond to thermal conditions or heat conduction properties at the surface of the piston, in particular at the end face of the piston. In other words, a temperature change the measuring point 28 is subjected to during operation may or may substantially correlate to, in particular may or may substantially be proportional or identical to, a temperature change the surface of the piston, in particular at the end face of the piston, is subjected to during operation.

In the shown configuration, the temperature sensor 26 is provided such that the measuring point 28 is located within the cylinder head 16. In other words, the temperature sensor 26 is configured to measure the temperature values at the measuring point 28 which is located within the cylinder head 16. Alternatively, the measuring point 28 may be located inside the combustion chamber, wherein in particular a part of the temperature sensor protruding into the combustion chamber may be covered by a cover.

More specifically, in the shown configuration, the measuring point 28 is arranged at a distance X to the combustion chamber, wherein the distance X is a minimal distance between the measuring point 28 and the combustion chamber, in particular to an outer surface of the combustion chamber. Specifically, the distance X may be in the range of 0.3 mm to 10 mm. Further, the measuring point 28 is arranged at a further distance Y to the longitudinal axis L of the cylinder 12, wherein the further distance Y is a minimal distance between the measuring point 28 and the longitudinal axis L. Specifically, the further distance Y may be in the range of 10% to 100% of a diameter of the cylinder 12 or the cylinder liner 18, in particular of a diameter of the cylinder 12 around its longitudinal axis L.

The temperature sensor 26 may be provided in the form of a thermocouple or in the form of any other suitable device for measuring the temperature values. The temperature sensor 26 comprises a probe 30 which is introduced into a correspondingly designed recess 32 in the cylinder head 16. Specifically, in the shown configuration, the cylinder head 16 is provided with the recess 32 in the form of a blind hole into which the probe 30 is introduced such that a tip of the probe 30 is in contact, in particular in thermal contact, with an end surface, i.e. a bottom, of the recess 32, as depicted in FIG. 2. In this configuration, the tip of the probe 30 coincides with the measuring point 28.

Further, the tip of the probe 30 may be pressed or spring-biased against the end surface of the recess 32. In this way, the thermal contact between the probe 30 and the bottom of the recess 32 may be reliably maintained during operation of the engine. Alternatively or additionally, a thermal paste may be introduced or applied in the recess 32, in particular in the area of the tip of the probe 30. In this way, favorable thermal conditions, e.g. a good heat conductivity, may be established.

In a next optional step S2, the control unit determines the combustion surface temperature of the piston in dependence on the obtained temperature values. In this step, the control unit may make use of the correlation between the measured temperature values and the combustion surface temperature. In other words, the control unit may know or estimate this correlation and use it to determine the combustion surface temperature based on the obtained temperature values. For doing so, the control unit may use a predetermine correlation between the temperature values and the combustion surface temperature. For example, the predetermine correlation may be provided in the form of a mathematical function or algorithm. Alternatively, the predetermined correlation may be provided in the form a characteristic diagram or a set of characteristic curves. In this way, based on the measured temperature values as an input, the correlating or corresponding combustion surface temperature may be derived or determined by the control unit.

In a next optional step S3, the control unit determines at least one operating parameter. In the context of the present disclosure, the term "operating parameter" refers to any parameter being indicative of an operating condition of the engine 10. For example, the operating parameters may refer to or be at least one of an engine power, an engine torque, an ignition timing, a valve actuation timing, a cooling characteristic, an air supply characteristic, and a fuel supply characteristic. Specifically, the ignition timing may refer to a timing during an operating cycle of the cylinder 11 at which ignition in its combustion chamber is initiated. Further, the valve actuation timing may refer to a timing at which an intake or exhaust valve associated to the cylinder 12 is opened and/or closed during the operating cycle. Still further, the cooling characteristic may refer to a parameter being indicative of a cooling power used for cooling the cylinder 12. For example, the cooling characteristic may refer to a temperature or flow rate of the cooling medium directed through the cooling channel 24. Still further, the air supply characteristic may be indicative of or may be a supply air mass flow rate or a supply air volumetric flow rate. Still further, the fuel supply characteristic may be indicative of or may be a fuel consumption, e.g. a fuel mixture mass or volumetric flow rate or a natural gas consumption, more particularly a natural gas supply mass flow rate or a natural gas supply volumetric flow rate.

In a next optional step S4, the control unit monitors characteristics of the fuel mixture in dependence on or based on the obtained temperature values, in particular in dependence on or based on the determined combustion surface temperature, and optionally in dependence on or based on the determined at least one engine operating parameter. Specifically, in this step, the control unit may monitor or determine a composition of the fuel mixture introduced into the cylinder 12, in particular a ratio of hydrogen and natural gas of the fuel mixture. For example, for doing so, the control unit may determine whether for given operating parameters the measured temperature values are relatively low, in particular when compared to a reference temperature, thereby determining that the relative portion of hydrogen in the fuel mixture may be too high or higher than an expected or predetermined value. Accordingly, in case the measured temperature values indicate a relatively high temperature, the control unit may determine that the relative portion of hydrogen in the fuel mixture may be too low or lower than an expected or predetermine value. This monitoring routine may be based on the effect that combustion temperatures typically decrease with an increasing relative portion of hydrogen in the fuel mixture.

In the following, an exemplary configuration of step S4 of monitoring characteristics of the fuel mixture is described.

In a first sub step, a reference temperature is determined based on the determined operating parameters. Then, in a next sub-step, a difference between the reference temperature and the obtained temperature value or the combustion surface temperature is compared with a threshold range, indicating a measurement tolerance range. In case the difference lies within the threshold range, the control unit may determine that a composition of the fuel mixture corresponds to a desired or predetermined composition. In case the difference lies outside the threshold range, then the control unit may determine that a composition of the fuel mixture does not correspond to a desired or predetermined composition. Specifically, in case the determined or obtained temperature is greater than the reference temperature, the control unit may determine that the relative portion of hydrogen in the fuel mixture may be too low. Yet, in case the determined or obtained temperature is smaller than the reference temperature, the control unit may determine that the relative portion of hydrogen in the fuel mixture may be too high.

In an alternative configuration, the control unit may be configured to determine a ratio of hydrogen and natural gas of the fuel mixture in dependence on the determined operating parameters and the obtained temperature values or determined combustion surface temperature. For doing so, e.g., the control unit may use multidimensional performance maps.

In a next step S5, the control unit controls operation of the engine 10 in dependence on the obtained temperature values. Specifically, this step S5 may comprise controlling or adjusting at least one of the ignition timing, the valve actuation timing, the cooling characteristic, the air supply characteristic and the fuel supply characteristic. More specifically, this step S5 may be performed in dependence on the outcome of step S4, in particular in dependence on the determined composition of the fuel mixture or the ratio of hydrogen and natural gas in the fuel mixture. For example, in case the control unit determines in step S4 relative low or high temperature values or determines that the ratio of hydrogen in the fuel mixture has increased or decreased, the control unit may adapt the operating parameters, in particular the ignition timing and/or the valve actuation timing, so as to adjust combustion processes in the combustion chamber. Alternatively or additionally, in case the control unit determines that the obtained temperature values are relatively low, the control unit may adapt the cooling characteristics so as to decrease the cooling of the cylinder, i.e. to decrease a heat flow from the combustion chamber to the cooling medium flowing through the cooling channel 24. For doing so, the control unit may increase the cooling temperature and/or may decrease the cooling flow of the cooling medium flowing through the cooling channel 24. Accordingly, in case the control unit determines that the obtained temperature values are relatively high, the control unit may adapt the cooling characteristics so as to increase the cooling of the cylinder, e.g. by increasing a heat flow from the combustion chamber to the cooling medium. For doing so, the control unit may decreased according temperature and or may increase the cooling flow of the cooling medium.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention. This particularly applies in view of the technical features described in the following.

A method may be provided for controlling operation of an internal combustion engine configured to run on a fuel mixture of hydrogen and natural gas. The method may comprise a step of obtaining temperature values measured by at least one temperature sensor provided in a cylinder head of the engine; and a step of controlling operation of the engine in dependence on the temperature values.

The temperature sensor may be provided in the cylinder head such that the measured temperature values correlate to a combustion surface temperature prevailing at a surface of a piston of the engine. Alternatively or additionally, the temperature sensor may be provided in the cylinder head such that the temperature values are measured at a measuring point at which heat conduction properties during operation of the engine correspond to or substantially correspond to heat conduction properties at the surface of the piston.

Alternatively or additionally, the temperature sensor may be configured to measure the temperature values at a measuring point located within the cylinder head. Specifically, the measuring point may be positioned at a distance of 0.3 mm to 10 mm to a combustion chamber of the engine. Alternatively or additionally, the measuring point may be positioned at a further distance to a longitudinal axis of a cylinder, wherein the further distance may be in the range of 10% to 100% of a diameter of the cylinder.

Alternatively or additionally, the temperature sensor may comprise a probe which is introduced into a recess provided in the cylinder head, wherein a tip of the probe may be in thermal contact with an end surface of the recess. The tip of the probe may be pressed or spring-biased against the end surface of the recess.

In a further development, the method may further comprise a step of determining the combustion surface temperature of the piston in dependence on the obtained temperature values by using a predetermined correlation between the temperature values and the combustion surface temperature.

Alternatively or additionally, the method may further comprise a step of determining at least one engine operating parameter, wherein the engine operating parameter may be at least one of an engine power, an engine torque, a cooling characteristic, a valve actuation timing and an ignition timing.

Alternatively or additionally, the method may further comprise a step of monitoring a composition of the fuel mixture in dependence on the obtained temperature values. In a further development, in the step of monitoring a composition of the fuel mixture, a ratio of hydrogen and natural gas in the fuel mixture may be determined.

In a further development, the step of controlling operation of the engine comprises adjusting at least one of an ignition timing, a valve actuation timing, a cooling characteristic, an air supply characteristic and a fuel supply characteristic. Alternatively or additionally, the step of controlling operation of the engine is performed in dependence on the determined ratio of hydrogen and natural gas in the fuel mixture.

Furthermore, an internal combustion engine may be provided which is configured to run on a fuel mixture of a natural gas and hydrogen. The engine may comprise at least one temperature sensor provided in a cylinder head of the engine and a control unit configured for obtaining temperature values measured by the temperature sensor and for controlling operation of the engine in dependence on the obtained temperature values.

INDUSTRIAL APPLICABILITY

With reference to the Figures, a method for controlling operation of an internal combustion engine is suggested. The method as suggested above is applicable in any suitable internal combustion engine configured to run on a fuel mixture of hydrogen and natural gas.

What is claimed is:

1. A method for controlling operation of an internal combustion engine configured to run on a fuel mixture of hydrogen and natural gas, the method comprising:
   obtaining temperature values measured by at least one temperature sensor provided in a cylinder head of the engine, the temperature values correspond to a composition of the fuel mixture, the fuel mixture is provided before entering a combustion chamber;
   determining a composition of the fuel mixture based on the obtained temperature values and a reference temperature, the composition indicative of a portion of hydrogen in the fuel mixture; and
   controlling operation of the engine based at least in part upon the composition of the fuel mixture.

2. The method according to claim 1, wherein the temperature sensor is provided in the cylinder head such that the temperature values correlate to a combustion surface temperature prevailing at a surface of a piston of the engine.

3. The method according to claim 1, wherein the temperature sensor is provided in the cylinder head such that the temperature values are measured at a measuring point at which heat conduction properties during operation of the engine correspond to or substantially correspond to heat conduction properties at a surface of a piston.

4. The method according to claim 1, wherein the temperature sensor is configured to measure the temperature values at a measuring point located within the cylinder head.

5. The method according to claim 4, wherein the measuring point is positioned at a distance of 0.3 mm to 10 mm to a combustion chamber of the engine.

6. The method according to claim 4, wherein the measuring point is positioned at a further distance to a longitudinal axis of a cylinder, and wherein the further distance is in the range of 10% to 100% of a diameter of the cylinder.

7. The method according to claim 1, wherein the temperature sensor comprises a probe which is introduced into a recess provided in the cylinder head, and wherein a tip of the probe is in thermal contact with an end surface of the recess.

8. The method according to claim 7, wherein the tip of the probe is pressed or spring-biased against the end surface of the recess.

9. The method according to claim 1, further comprising determining a combustion surface temperature of a piston based on the obtained temperature values by using a predetermined correlation between the temperature values and a combustion surface temperature.

10. The method according to claim 1, further comprising determining at least one engine operating parameter, wherein the engine operating parameter may be at least one of an engine power, an engine torque, a cooling characteristic, a valve actuation timing and an ignition timing.

11. The method according to claim 1, further comprising monitoring a composition of the fuel mixture based on the obtained temperature values and the reference temperature.

12. The method according to claim 1, wherein determining the composition of the fuel mixture further comprises determining a ratio of hydrogen and natural gas in the fuel mixture.

13. The method according to claim 1, wherein controlling operation of the engine comprises adjusting at least one of an ignition timing, a valve actuation timing, a cooling characteristic, an air supply characteristic and a fuel supply characteristic.

14. The method according claim 12, wherein the controlling operation of the engine further comprises controlling operation of the engine based at least in part upon the determined ratio of hydrogen and natural gas in the fuel mixture.

15. An internal combustion engine configured to run on a fuel mixture of a natural gas and hydrogen, the internal combustion engine comprising:
   at least one temperature sensor provided in a cylinder head of the engine; and
   a control unit operatively connected to the at least one temperature sensor, the control unit—configured to:
      obtain temperature values measured by the temperature sensor, the temperature values correspond to a composition of the fuel mixture, the fuel mixture is provided before entering a combustion chamber;
      determine a composition of the fuel mixture based on the obtained temperature values and a reference temperature, the composition indicative of a portion of hydrogen in the fuel mixture; and
      control operation of the engine based at least in part upon the composition of the fuel mixture.

* * * * *